C. CARPENTER.
WHEEL.
APPLICATION FILED DEC. 13, 1909.
986,906.
Patented Mar. 14, 1911.
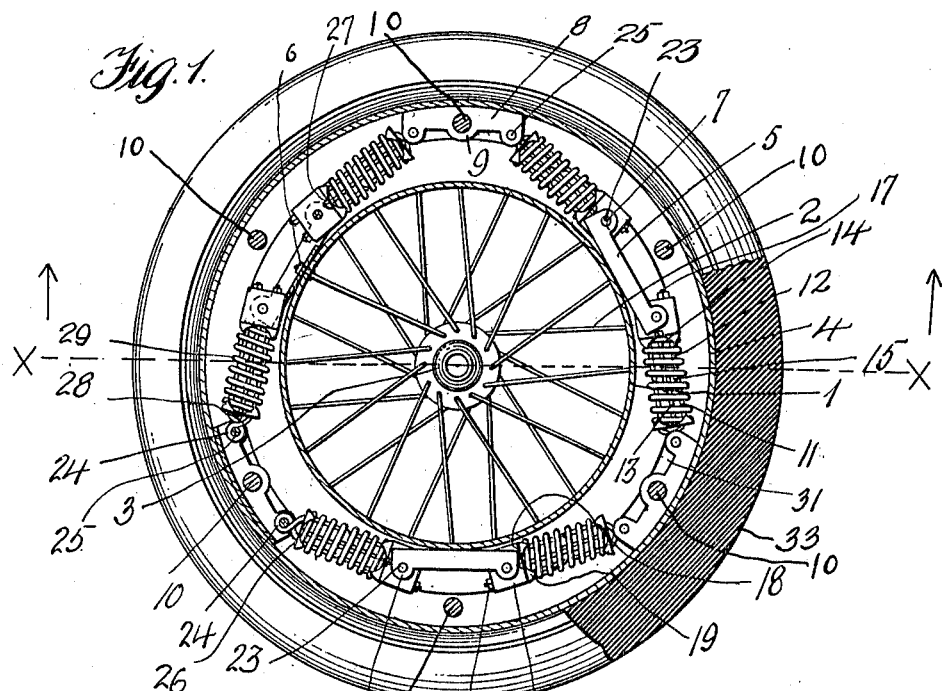
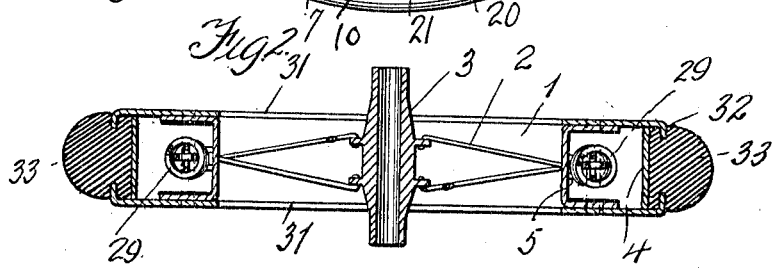
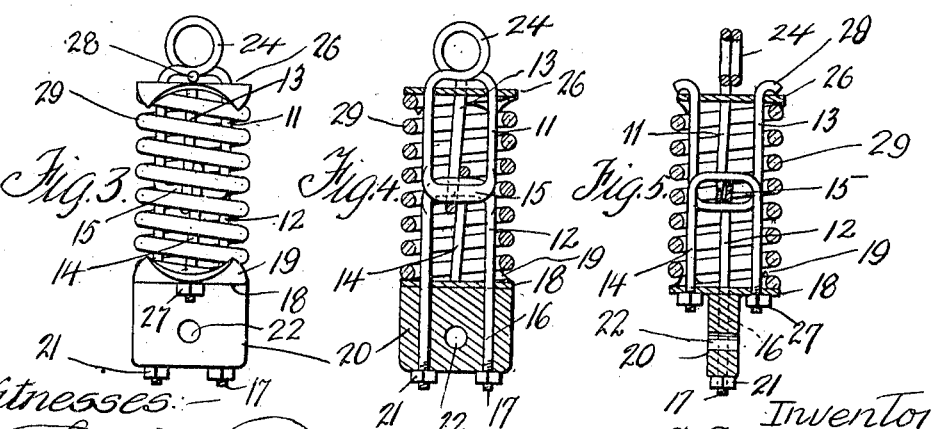
Witnesses
Samuel Payne
Inventor
C. Carpenter
by
Attorneys

UNITED STATES PATENT OFFICE.

CHALMER CARPENTER, OF PITTSBURG, PENNSYLVANIA.

WHEEL.

986,906.  Specification of Letters Patent.  Patented Mar. 14, 1911.

Application filed December 13, 1909. Serial No. 532,896.

*To all whom it may concern:*

Be it known that I, CHALMER CARPENTER, a citizen of the United States of America, residing at Pittsburg, in the county of Allegheny and State of Pennsylvania, have invented certain new and useful Improvements in Wheels, of which the following is a specification, reference being had therein to the accompanying drawing.

This invention relates to wheels, and more particularly to certain new and useful improvements in that type of wheels disclosed in my pending application filed January 22, 1909, Serial No. 473757, wherein I have illustrated a wheel that can be used in connection with automobiles and similar vehicles, the wheel being constructed to eliminate the use of springs beneath the vehicle body.

Besides having the same objects in view as disclosed in my pending application, the present invention aims to provide a more durable spring construction which will insure a positive coöperation of the springs of the wheel irrespective of the direction pressure is brought to bear upon the hub when the wheel is in operation.

Another object of the present invention is to provide a wheel of the above type with a novel casing adapted to exclude dust and dirt and foreign matter that would have a tendency to impair the springs forming part of the wheel.

With these and such other objects in view as may hereinafter appear, the invention consists of the novel construction, combination and arrangements of parts to be hereinafter specifically described and then claimed.

Reference will now be had to the drawing forming a part of this specification, wherein there is illustrated a preferred embodiment of the invention, but it is to be understood that the structural elements thereof can be varied or changed, as to the size, shape and manner of assemblage without departing from the spirit of the invention.

In the drawings:—Figure 1 is a side elevation of the wheel partly broken away and partly in section. Fig. 2 is a cross sectional view of the wheel on line *x*—*x*, Fig. 1. Fig. 3 is an enlarged elevation of one of the spring units of the wheel. Fig. 4 is a vertical cross sectional view of the same, and Fig. 5 is a vertical transverse sectional view of the spring unit.

In the accompanying drawings the reference numeral 1 denotes a metallic felly channel-shaped in cross section and connected by a plurality of tangential spokes 2 to a hub 3, the spokes being made of metal and arranged somewhat similar to the spokes of a bicycle wheel. The channel-shaped felly 1 is surrounded by a metallic rim 4 and interposed between said rim and the felly 1 is a plurality of spring units adapted to coöperate in supporting the hub 3 centrally of the wheel, the spring units being designed to afford sufficient resiliency whereby the hub 3 and the weight supported thereby will be thoroughly cushioned.

To support and properly distribute the spring units between the felly and rim, two sets of coupling members are employed, one set associating with the felly and the other set with the rim. The coupling members of that set which associates with the felly are indicated by the reference character 5 and are secured in position by rivets 6 or other suitable hold-fast devices and the coupling members of that set which associates with the rim are indicated by the reference character 8. Each of the coupling members is trough-shaped in contour and the members 5 are oppositely disposed with respect to the members 8. Each of the coupling members at each end is provided with a pair of apertured ears 7. Each of the members 8 intermediate its ends is provided with a pair of openings 9 through which extend certain of the bolts 10 whereby the coupling members 8 will be connected in position against the inner face of the rim. The manner of positioning the bolts 10 for maintaining the coupling members 8 against the rim will be hereinafter referred to. Each spring unit comprises a pair of shiftable links and a pair of shiftable yokes, the links interlocking with the yokes. The links of the pair are indicated by the reference characters 11 and 12, the link 11 being the outer link and the link 12, the inner link, the links extend in opposite directions with respect to each other, but are arranged in parallel planes. The yokes of the pair are indicated by the reference characters 13 and 14, the yoke 13 being the outer and the yoke 14 the inner one, the yokes extend in opposite directions with respect to each other, but are arranged in parallel planes at right angles with respect to the links 11 and 12. The inner ends of the links 11 and 12 are flattened and beveled, as at 15, whereby they will easily ride against one another. The lower end of the link 12 is open to provide parallel shanks 16 having the lower ends thereof threaded, as at 17.

Mounted on the shanks 16 is a rectangular plate 18 having openings formed therein to receive the shanks 16. The corners of the plate 18 are bent upwardly, as at 19, to form a cup. The plate 18 is retained upon the shanks 16 by coupling piece 20 and the coupling piece is retained upon the shanks by nuts 21 threaded thereon. The coupling piece is provided with an opening 22, whereby it can be pivotally connected to one of the coupling members 5 by transverse pins 23.

The upper end of the link 11 is bent to form an eyelet 24 adapted to be connected to the coupling members 8 by transverse pins 25. Prior to the formation of the link 11 a plate 26 is mounted upon the link, said plate being similar to the plate 18.

The lower end of the yoke 14 is open to provide shanks adapted to extend through the plate 18, said shanks being held in said plate by nuts 27. The upper end of the yoke 13 is open to provide shanks adapted to extend through the plate 26, and the ends of the yoke are bent or clenched, as at 28, upon the plate 26.

Interposed between the plates 18 and 26 and encircling the links 11 and 12 and yokes 13 and 14 is a coiled spring 29 serving functionally either as an extension spring or a compression spring, according to the direction in which pressure is brought to bear upon the hub 3.

Mounted against the periphery of the rim is a tire 33 which is preferably formed of hard rubber and has each of its sides provided with a groove. Arranged against each edge of the rim is an annular side plate 31 having its outer edge bent inwardly and extending into a groove of the tire to form a clencher. The inwardly-bent edges of the side plates 31 are indicated by the reference character 32 and when in engagement with the grooves of the tire 33 retain the tire in position upon the rim 4. The side plates 31 are maintained in abutting engagement against the edges of the rim 4 by a series of bolts 10 which project through the side plates and carry on their projecting ends the clamping nuts 30. Certain of the bolts 10 extend through the openings 9 of the coupling members 8 whereby said coupling members 8 are connected in position against the inner face of the rim 4. The coupling members 8 are inverted relative to the members 5 and they conform to the shape of the rim 4 to form a substantial bearing, particularly when pressure is brought to bear upon the spring units connected to said members.

The arrangement of the links 11 and 12 relative to the yokes 13 and 14 limits the expansion of the spring 29, but the links and yokes are made of a sufficient length and the springs of a sufficient strength to allow the units to coöperate in cushioning a load. The compression of the springs 29 is only limited by the inner ends of the yokes contacting with the plates 18 and 26, but the tension of the springs 29 is such that this will seldom occur.

Having now described my invention what I claim as new, is:—

1. A wheel comprising a felly, a rim spaced therefrom and provided with a tire, a set of outer coupling members, holdfast devices for securing said members against the inner face of the rim, a set of inner coupling members secured to the outer face of the felly, a plurality of pairs of inner and outer shiftable links, means whereby the outer link of each pair is connected to an outer coupling member, a plate carried by each of the links of a pair, yokes attached to the said plates and extending through the links for slidably connecting each pair of links together, a coupling piece carried by each of the inner links of the pairs of links for connecting the inner links to the inner coupling members, said coupling pieces further constituting abutments for the plates carried by the inner links of the pairs of links, and a spring surrounding said links and yokes and interposed between the plates.

2. A wheel comprising a felly, a rim spaced from the felly and provided with a tire, a set of outer coupling members, means for connecting said members against the inner face of the rim, a set of inner coupling members secured against the outer face of the felly, a plurality of sets of links, each set of links comprising an inner and an outer link, plates carried by and connected to the links of each set, inner and outer yokes extending through the links of each set for connecting them together, and extending through the plates, a spring surrounding the links of each set and their respective yokes and interposed between the plates, means whereby an outer link of each set is connected to one end of an outer coupling member, and means whereby an inner link of each set is connected to one end of an inner coupling member.

3. A wheel comprising a felly, a rim spaced from the felly and provided with a tire, a set of outer coupling members, means for connecting said members against the inner face of the rim, a set of inner coupling members secured against the outer face of the felly, a plurality of sets of shiftable links, each set of links comprising an inner and an outer link extending in parallel planes, a pair of yokes extending through the links of each set and at right angles with respect to the planes of the links for slidably connecting the links of each set together, means whereby each set of links is connected to one end of an outer coupling member and to one end of an inner coupling member, a pair of plates carried by the links and yokes of each set, and a spring surrounding the links and yokes of each set and interposed between said plates.

4. A wheel comprising a felly, a rim spaced from the felly and provided with a tire, a set of outer coupling members, means for maintaining said members against the inner face of the rim, a series of inner coupling members secured against the outer face of the felly, a plurality of sets of links, yokes extending through the links of each set for slidably connecting them together, means for pivotally connecting each set of links to one end of an outer coupling member, means for pivotally connecting the other ends of each set of links to one end of an inner coupling member, a pair of plates carried by each set of links and their respective yokes, and a spring surrounding each set of links and their respective yokes and interposed between said plates.

5. A wheel comprising a felly, a rim spaced therefrom and provided with a tire, a set of outer coupling members, means for connecting said members against the inner face of the rim, a series of inner coupling members secured against the outer face of the felly, a plurality of sets of links, the links of each set extending in parallel planes, yokes extending through the links of each set for shiftably connecting them together, said yokes disposed in parallel planes and in planes at right angles with respect to the planes of the links, a coupling piece carried by a link of each set for connecting its respective set of links to one end of an inner coupling member, means for pivotally connecting one of the links of each set to one end of an outer coupling member, a pair of plates carried by the links of each set and their respective yokes, and a spring surrounding the links of each set and their respective yokes and interposed between a pair of plates.

In testimony whereof I affix my signature in the presence of two witnesses.

CHALMER CARPENTER.

Witnesses:
    MAX H. SROLOVITZ,
    K. H. BUTLER.

---

Copies of this patent may be obtained for five cents each, by addressing the "Commissioner of Patents, Washington, D. C."